(12) United States Patent
Hong (10) Patent No.: US 9,302,873 B2
(45) Date of Patent: Apr. 5, 2016

(54) FILM TREATING APPARATUS AND FILM TREATING METHOD USING THE SAME

(71) Applicant: Samsung Display Co., Ltd., Yongin, Gyeonggi-do (KR)

(72) Inventor: Dong Ho Hong, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 121 days.

(21) Appl. No.: 14/034,938

(22) Filed: Sep. 24, 2013

(65) Prior Publication Data

US 2014/0338819 A1 Nov. 20, 2014

(30) Foreign Application Priority Data

May 15, 2013 (KR) .......................... 10-2013-0055087

(51) Int. Cl.
| | | |
|---|---|---|
| *B65H 16/00* | (2006.01) | |
| *B65H 23/26* | (2006.01) | |
| *B32B 38/18* | (2006.01) | |
| *B65H 18/10* | (2006.01) | |
| *B32B 37/24* | (2006.01) | |

(52) U.S. Cl.
CPC ............... *B65H 23/26* (2013.01); *B32B 38/18* (2013.01); *B65H 18/103* (2013.01); *B32B 2037/243* (2013.01); *B32B 2457/20* (2013.01); *B65H 2801/61* (2013.01); *Y10T 156/17* (2015.01)

(58) Field of Classification Search
CPC ........ B65H 16/00; B65H 23/02; B65H 19/14; B65H 23/048; B65H 23/16; B05C 9/00; B32B 2457/20; B32B 38/18; B32B 2037/243
USPC .......... 156/160, 538, 540, 539, 573; 229/108, 229/120, 195, 118.3, 109, 137, 141, 174, 229/179, 180; 427/175, 172; 118/33, 500; 226/1, 118.2, 118.3, 108, 120, 195, 226/109, 137, 141, 174, 179, 180; 242/417–417.3, 419, 419.6, 419.7
See application file for complete search history.

(56) References Cited

U.S. PATENT DOCUMENTS

2007/0125820 A1* 6/2007 Weber et al. ...................... 226/4

FOREIGN PATENT DOCUMENTS

| KR | 10-2009-0019735 | 2/2009 |
| KR | 10-2009-0097223 | 9/2009 |
| KR | 10-2010-0106034 | 10/2010 |

OTHER PUBLICATIONS

KR 1020090097223 A, Suzuki Masahiro, Adhesive film adhering device and adhesive film tape feeding machanism Sep. 2009.*

* cited by examiner

*Primary Examiner* — Vishal I Patel
(74) *Attorney, Agent, or Firm* — Knobbe Martens Olson & Bear LLP (57) ABSTRACT

A film treating apparatus includes a film feeder configured to feed a film having first and second surfaces, a film processor configured to process the film fed from the film feeder, a film collector configured to collect the film processed by the film processor, a fixed support unit configured to support at least one of the first or second surface of the film and to guide the movement of the film, and a variable support unit configured to apply tension to the film while moving from the first surface of the film toward the second surface of the film.

13 Claims, 10 Drawing Sheets

FILM TREATING APPARATUS AND FILM TREATING METHOD USING THE SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority from Korean Patent Application No. 10-2013-0055087 filed on May 15, 2013 in the Korean Intellectual Property Office, the disclosure of which is incorporated herein by reference in its entirety.

BACKGROUND

1. Field

The present disclosure relates to a film treating apparatus which includes one or more rollers and a film treating method using the film treating apparatus.

2. Description of the Related Technology

Generally, a process of manufacturing a flat panel display (FPD) such as a liquid crystal display (LCD) panel, a plasma display panel (PDP), and the like, includes a process of bonding a driver integrated circuit (IC) or a flexible printed circuit (FPC) with a substrate by coating an anisotropic conductive film (ACF) on an edge of the substrate.

An ACF includes an adhesive binder resin and fine conductive particles evenly dispersed in the binder resin. The ACF may be thermally compressed, so that electrodes are electrically connected to each other with the conductive particles interposed therebetween. In addition, the binder resin may be cured by heating the ACF, so that a driver circuit can be fixed to a liquid crystal panel or a printed circuit board (PCB).

SUMMARY OF CERTAIN INVENTIVE ASPECTS

According to an aspect of the present invention, a film treating apparatus includes a film feeder configured to feed a film having first and second surfaces, a film processor configured to process the film fed from the film feeder, a film collector configured to collect the film processed by the film processor, a fixed support unit configured to support the first surface of the film and to guide the movement of the film, and a variable support unit configured to apply tension to the film while moving from the first surface of the film toward the second surface of the film.

According to another aspect of the present invention, a film treating method includes feeding a film from a film feeder, moving the film along an outer circumference of a fixed support unit which supports the film and guides the movement of the film, applying tension to the film by moving a variable support unit from a first surface of the film toward a second surface of the film, processing the film, and collecting the processed film.

BRIEF DESCRIPTION OF THE DRAWINGS

The above and other aspects and features of the present invention will become more apparent by describing in detail certain embodiments thereof with reference to the attached drawings, in which.

DETAILED DESCRIPTION OF CERTAIN INVENTIVE EMBODIMENTS

The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are provided to assist those of ordinary skill in the art in a comprehensive understanding of the invention, and the present invention is defined within the scope of the appended claims.

The term "on" that is used to designate that an element is on another element or located on a different layer or a layer includes both a case where an element is located directly on another element or a layer and a case where an element is located on another element via another layer or still another element. In the entire description of the present invention, the same drawing reference numerals are generally used for the same elements across various figures.

Although the terms "first," "second," and so forth, are used to describe diverse constituent elements, such constituent elements are not limited by the terms. The terms are used only to discriminate a constituent element from other constituent elements. Accordingly, in the following description, a first constituent element may be a second constituent element.

Hereinafter, embodiments of the present invention will be described with reference to the attached drawings.

Various ACF attachment devices for bonding a driver IC or an FPC with a substrate using an ACF have been developed. In the case of an ACF attachment apparatus including a plurality of rollers, when an ACF is used up, the ACF requires replacement by hand. This increases the time required to replace the ACF and causes contamination of the ACF.

Aspects of the present invention provide a film treating apparatus in which a film can easily be replaced. Aspects of the present invention also provide a film treating method in which a film can be easily replaced.

However, aspects of the present invention are not restricted to the ones set forth herein. The above and other aspects of the present invention will become more apparent to one of ordinary skill in the art to which the present invention pertains by referencing the detailed description given below.

Figure 1:
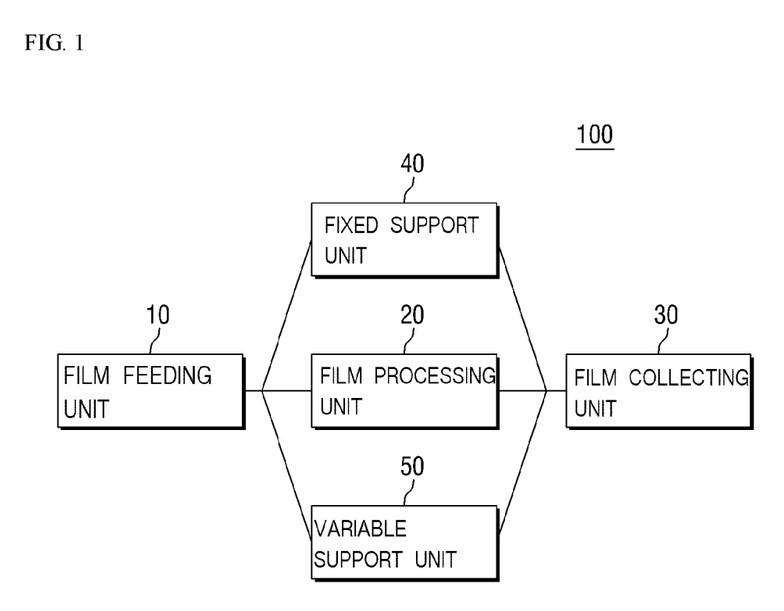
FIG. 1 is a block diagram of a film treating apparatus according to an embodiment of the present invention.

FIG. 1 is a block diagram of a film treating apparatus 100 according to an embodiment of the present invention.

Referring to FIG. 1, the film treating apparatus 100 includes a film feeder 10 which feeds a film having first and second surfaces, a film processor 20 which processes the film fed from the film feeder 10, a film collector 30 which collects the film processed by the film processor 20, a fixed support unit 40 which supports the first surface of the film and guides the movement of the film, and a variable support unit 50 which applies tension to the film while moving from the first surface of the film toward the second surface of the film.

The film feeder 10 may feed the film to the film processor 20. There is no restriction on the type and material of the film used in the embodiments of the present invention. The film used herein may be understood as a concept encompassing all types of sheets, thin films or substrates that can be bent, folded and rolled. The film may be a single layer or a stacked structure including multiple layers. In one embodiment, the film may be an anisotropic conductive film (ACF) having two layers.

There is no restriction on the way the film feeder 10 feeds the film to the film processor 20, as the film feeder 10 can feed the film to the film processor 20 in various ways. The film feeder 10 may include, for example, an unwinding roll that unwinds the film wound therearound.

The film processor 20 may process the film. In the present disclosure, "processing the film" includes changing physical and chemical properties of the film by performing a particular treatment on the film, coating a particular material on the film, or forming a film stacked structure by stacking another film on the film. In addition, a process of separating a layer of a film having a multilayer structure from the film may also be included in the meaning of "processing". However, the meaning of "processing" is not limited to the above examples and can be understood as the broadest concept that encompasses a dictionary definition and an idiomatic meaning.

In one embodiment in which the film is an ACF having two layers, the film may include a support layer and a film layer. In such an embodiment, the film processor 20 may separate the film layer from the support layer. This is described in more detail below.

The film processed by the film processor 20 may be collected by the film collector 30. There is no restriction on the way the film processor 30 collects the film, and the film processor 30 can collect the processed film in various ways. The film collector 30 may include, for example, a winding roll that winds the film therearound.

The fixed support unit 40 may support the first and second surfaces of the film and guide the movement of the film. The fixed support unit 40 may at least partially contact the film and hold the film. In addition, the fixed support unit 40 may change the travelling direction of the film as well as holding the film. In other words, the film may travel along an outer circumference of the fixed support unit 40 while at least partially contacting the outer circumference of the fixed support unit 40. That is, the film fed from the film feeder 10 is held by the fixed support unit 40 and travels along the outer circumference of the fixed support unit 40 to be collected by the film collector 30 via the film processor 20.

The fixed support unit 40 may include a plurality of cylindrical rods or rollers.

In one embodiment, at least one roller of the fixed support unit 40 may be placed between the film feeder 10 and the film processor 20 and/or between the film processor 20 and the film collector 30. However, this is merely an example, and there is no restriction on the positions and number of the rollers of the fixed support unit 40. That is, the rollers of the fixed support unit 40 may be placed a certain distance from the film feeder 10, the film processor 20 or the film collector 30, or they may be placed in a scattered manner.

The variable support unit 50 may apply tension to the film supported by the fixed support unit 40 while moving in a certain direction.

The variable support unit 50 may be placed to be adjacent to, or contact the film. The variable support unit 50 may move from the first surface of the film toward the second surface of the film or from the second surface of the film toward the first surface of the film. That is, the variable support unit 50 may move toward the second surface of the film while remaining in contact with the first surface of the film or may move toward the first surface of the film while remaining in contact with the second surface of the film, thereby applying tension to the film supported by the fixed support unit 40. The variable support unit 50 may make a rectilinear motion. However, the motion of the variable support unit 50 is not limited to the rectilinear motion, and the variable support unit 50 may also make a rotary motion or a swivel motion with respect to one axis.

The variable support unit 50 may include a plurality of cylindrical rods or rollers.

The operation of the film treating apparatus 100 according to embodiments of the present invention is described below. To describe the operation of the film treating apparatus 100, an initial state is defined. The term "initial state" refers to a state before the variable support unit 50 applies tension to the film. For example, the initial state may include a state where the variable support unit 50 and the film are separated from each other and a state where the variable support unit 50 applies no force to the film although it contacts the film.

For ease of description, a case where the fixed support unit 40 including a plurality of scattered rollers supports the first surface of the film is described below as an example. In the initial state, the variable support unit 50 including a plurality of rollers may be placed on the first surface side of the film. As described above, the variable support unit 50 may be separated from the film by a predetermined distance. In the initial state, if the variable support unit 50 moves toward the first surface of the film, the first surface of the film and the variable support unit 50 may at least partially contact each other. In a state where the first surface of the film and the variable support unit 50 contact each other, if the variable support unit 50 continuously moves toward the second surface of the film, the film may protrude a certain distance toward the second surface of the film due to the movement of the variable support unit 50. Accordingly, the whole of the film having an end connected to the film feeder 10 and the other end connected to the film collector 30 may be stretched tight. That is, since the film is supported by the fixed support unit 40 and the variable support unit 50, greater tension may be applied to the film as compared with the initial state where the film is supported only by the fixed support unit 40. Accordingly, the film stretched more tightly may travel along the fixed support unit 40 and the variable support unit 50.

The film processor 20 may be placed on the first surface side and/or the second surface side of the film. The film processor 20 may be placed to contact or be adjacent to the first surface or the second surface of the film and may perform particular treatment on the travelling film. The film may travel continuously or discontinuously according to the type of processing performed by the film processor 20 on the film. The movement speed of the film may also vary according to the type of processing performed by the film processor 20. The processing performed by the film processor 20 is described in detail further below.

When the processing by the film processor 20 is terminated or when the film fed from the film feeder 10 is used up, the film fed from the film feeder 10 may be replaced. In this case, the variable support unit 50 may release the tension applied to the film and return to the initial state. When the variable support unit 50 releases the tension applied to the film and then returns to the initial state, the film may become relatively loosened as compared with when the variable support unit 50 applies tension to the film. When the film is loosened, it is easy to replace the film, and the time required to replace the film can be reduced. This improves the overall process efficiency.

As described above, the fixed support unit 40 and/or the variable support unit 50 may include a plurality of rollers. The fixed support unit 40 and/or the variable support unit 50 including the rollers may reduce the friction of the film moving along the fixed support unit 40 or the variable support unit 50, thereby facilitating the movement of the film and preventing the damage to the film due to the friction.

Specific embodiments of the present invention will hereinafter be described with reference to the attached drawings.

Figure 2:
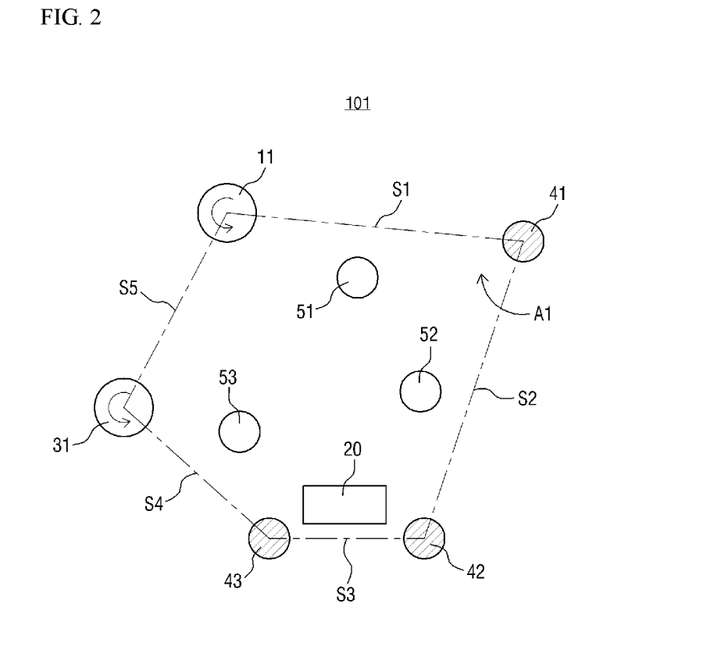
FIG. 2 is a cross-sectional view of a film treating apparatus according to an embodiment of the present invention.
Figure 3:
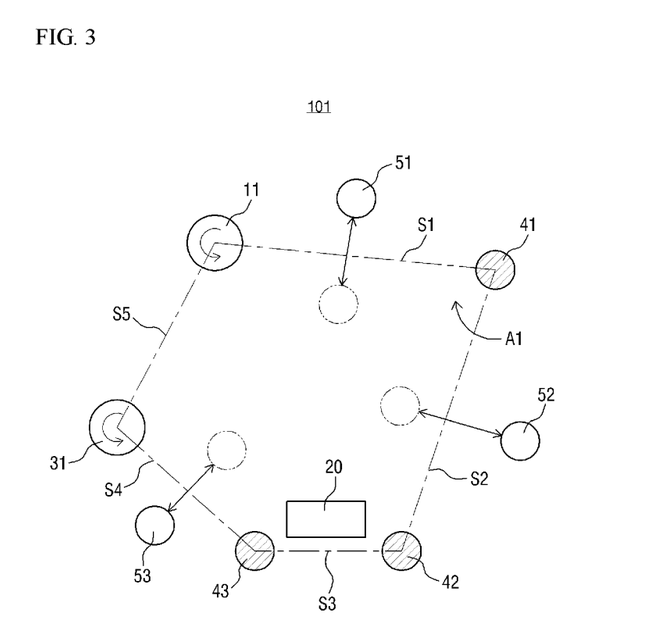
FIG. 3 is a cross-sectional view illustrating the operation of the film treating apparatus according to the embodiment of FIG. 2.

FIG. 2 is a cross-sectional view of a film treating apparatus 101 according to an embodiment of the present invention. FIG. 3 is a cross-sectional view illustrating the operation of the film treating apparatus 101 according to the embodiment of FIG. 2.

Referring to FIG. 2, the film treating apparatus 101 includes an unwinding roll 11, a first fixed roller 41 which is separated from the unwinding roll 11 in a first direction, a second fixed roller 42 which is separated from the first fixed roller 41 in a second direction different from the first direction, a third fixed roller 43 which is separated from the second fixed roller 42 in a third direction different from the second direction, a film processor 20 which is disposed between the second fixed roller 42 and the third fixed roller 43, a first moving roller 51 which is disposed between a winding roll 31 and the first fixed roller 41, a second moving roller 52 which is disposed between the first fixed roller 41 and the second fixed roller 42, and a third moving roller 53 which is disposed between the third fixed roller 43 and a winding roll 31.

For ease of description, in the cross-sectional view of FIG. 2, a line segment connecting a center of the unwinding roll 11 and a center of the first fixed roller 41 may be defined as a first line segment S1, a line segment connecting the center of the first fixed roller 41 and a center of the second fixed roller 42 may be defined as a second line segment S2, a line segment connecting the center of the second fixed roller 42 and a center of the third fixed roller 43 may be defined as a third line segment S3, a line segment connecting the center of the third fixed roller 43 and a center of the winding roll 31 may be defined as a fourth line segment S4, and a line segment connecting the center of the unwinding roll 11 and the center of the winding roll 31 may be defined as a fifth line segment S5.

In addition, in the cross-sectional view of FIG. 2, a pentagonal first area A1 having the unwinding roll 11, the first fixed roller 41, the second fixed roller 42, the third fixed roller 43, and the winding roll 31 as its vertices may be defined. As described above, the number of fixed rollers is not limited to a particular number and may be greater or smaller than three. If the number of fixed rollers is three or more, five or more line segments may be defined, and the first area A1 may be shaped like a polygon having a film feeder 10, the fixed rollers, and the film collector 30 as its vertices.

As described above, the film feeder 10 may include the unwinding roll 11 which unwinds a film wound therearound, and the film collector 30 may include the winding roll 31 which collects the film by winding the film therearound. In FIG. 2, a case where the film feeder 10 includes the unwinding roll 11 and the film collector 30 includes the winding roll 31 is illustrated.

In addition, as described above, each of a fixed support unit 40 and a variable support unit 50 may include a plurality of rollers. In FIG. 2, the fixed support unit 40 includes three fixed rollers (41, 42 and 43), and the variable support unit 50 includes three moving rollers (51, 52 and 53). However, the three fixed rollers and the three moving rollers are merely an example, and the scope of the present invention is not limited by the number of fixed rollers and the number of moving rollers. That is, the number of fixed rollers and the number of moving rollers may be greater or smaller than those in FIG. 2.

The unwinding roll 11 may unwind a film wound therearound in a certain direction. The film may be identical to the film described above, and thus a description thereof will be omitted.

The winding roll 31 may be separated from the third fixed roller 43 by a predetermined distance. In one embodiment, the winding roll 31 may collect the film coming from the third fixed roller 43.

The first fixed roller 41 may be placed adjacent to the unwinding roll 11. In other words, the first fixed roller 41 may be separated from the unwinding roll 11 in the first direction by a predetermined distance. In addition, an axis of the first fixed roller 41 may be parallel to an axis of the unwinding roll 11.

The second fixed roller 42 may be placed adjacent to the first fixed roller 41. The second fixed roller 42 may be separated from the first fixed roller 41 in the second direction different from the first direction by a predetermined distance. However, this is merely an example, and the direction in which the second fixed roller 42 is separated from the first fixed roller 41 is not limited to the second direction, and the second fixed roller 42 may also be separated from the first fixed roller 41 in the first direction. In addition, an axis of the second fixed roller 42 may be parallel to the axis of the first fixed roller 41.

The third fixed roller 43 may be separated from the second fixed roller 42 by a predetermined distance. That is, the third fixed roller 43 may be separated from the second fixed roller 42 in the third direction different from the second direction. The third direction may be different from the second direction but may be the same as the first direction.

The film processor 20 may be disposed between the second fixed roller 42 and the third fixed roller 43.

In the cross-sectional view of FIG. 2, the film processor 20 may be disposed inside and/or outside the third line segment S3 that connects the second fixed roller 42 and the third fixed roller 43.

The first moving roller 51 may be disposed between the unwinding roll 11 and the first fixed roller 41. In one embodiment, the first moving roller 51 may be located inside the first line segment S1. In other words, the first moving roller 51 may be located within the first area A1. An axis of the first moving roller 51 may be parallel to the axis of the unwinding roll 11.

The second moving roller 52 may be disposed between the second fixed roller 42 and the third fixed roller 43. In one embodiment, the second moving roller 52 may be located inside the second line segment S2 to be adjacent to the second line segment S2. In other words, the second moving roller 52 may be located within the first area A1. In addition, an axis of the second moving roller 52 may be parallel to the axis of the second fixed roller 42 or the third fixed roller 43 adjacent thereto.

The third moving roller 53 may be disposed between the third fixed roller 43 and the winding roll 31. In one embodiment, the third moving roller 53 may be located inside the fourth line segment S4 to be adjacent to the fourth line segment S4.

Although not shown in the drawing, the film treating apparatus 101 may include a driving unit which drives the first moving roller 51, the second moving roller 52, and the third moving roller 53. The driving unit may include, but not limited to, a motor or an actuator or the like.

The above positions of the first moving roller 51, the second moving roller 52, and the third moving roller 53 are merely examples, and the positions and number of the moving rollers are not be limited to these. That is, a plurality of moving rollers may be scattered in various forms within the first area A1.

The operation of the film treating apparatus 101 according to one embodiment will now be described.

Referring to FIG. 3, a plurality of moving rollers in the film treating apparatus 101 may move in certain directions.

In an initial state, the first moving roller 51, the second moving roller 52 and the third moving roller 53 may be located inside the first line segment S1, the second line segment S2, and the fourth line segment S4, respectively. In addition, the first moving roller 51, the second moving roller 52, and the third moving roller 53 may be located adjacent to or may contact the first line segment S1, the second line segment S2, and the fourth line segment S4, respectively. In other words, the first moving roller 51, the second moving roller 52, and the third moving roller 53 may be located within the first area A1.

The first moving roller 51 may move across the first line segment S1. That is, the first moving roller 51 may move from inside the first line segment S1 to outside the first line segment S1 or from outside the first line segment S1 to inside the first line segment S1. The first moving roller 51 may make a rectilinear motion. However, the motion of the first moving roller 51 is not limited to the rectilinear motion, and the first moving roller 51 may also make a rotary motion with respect to one axis. In addition, after moving in a certain direction from the initial state, the first moving roller 51 may return to the initial state. That is, the first moving roller 51 may make a reciprocating motion within a particular section.

The second moving roller 52 may move across the second line segment S2. The second moving roller 52 may make a rectilinear motion. However, the motion of the second moving roller 52 is not limited to the rectilinear motion, and the second moving roller 52 may also make a rotary motion with respect to one axis. In addition, after moving in a certain direction from the initial state, the second moving roller 52 may return to the initial state. That is, the second moving roller 52 may make a reciprocating motion within a particular section.

The third moving roller 53 may move across the fourth line segment S4. The third moving roller 53 may make a rectilinear motion. However, the motion of the third moving roller 53 is not limited to the rectilinear motion, and the third moving roller 53 may also make a rotary motion with respect to one axis. In addition, after moving in a certain direction from the initial state, the third moving roller 53 may return to the initial state. That is, the third moving roller 53 may make a reciprocating motion within a particular section.

In other words, the first moving roller 51, the second moving roller 52, and the third moving roller 53 may move from inside the first area A1 to outside the first area A1 or from outside the first area A1 to inside the first area A1. The first moving roller 51, the second moving roller 52, and the third moving roller 53 may make a reciprocating motion within a particular section.

Although the first moving roller 51, the second moving roller 52 and the third moving roller 53 respectively move toward the first line segment S1, the second line segment S2 and the fourth line segment S4 in the drawing, the movement of the first moving roller 51, the second moving roller 52, and the third moving roller 52 is not limited thereto. The first moving roller 51, the second moving roller 52, and the third moving roller 53 may move simultaneously but may also move selectively. That is, one or more rollers selected from the group consisting of the first moving roller 51, the second moving roller 52 and the third moving roller 53 may move. In addition, a case where the first moving roller 51 moves toward the first line segment S1, the second moving roller 52 moves toward the second line segment S2, and the third moving roller 53 moves toward the fourth line segment S4 is illustrated in the drawing for ease of description. However, this is merely an example, and the scope of the present invention is not limited by this example. That is, at least one of a plurality of moving rollers may move toward at least one of a plurality of line segments defined as described above in the film treating apparatus 101.

In the film treating apparatus 101, the film may travel between the unwinding roll 11 and the winding roll 31. The operation of the film treating apparatus 101 in a state where the film is placed in the film treating apparatus 101 will now be described with reference to FIGS. 4 and 5.

Figure 4:
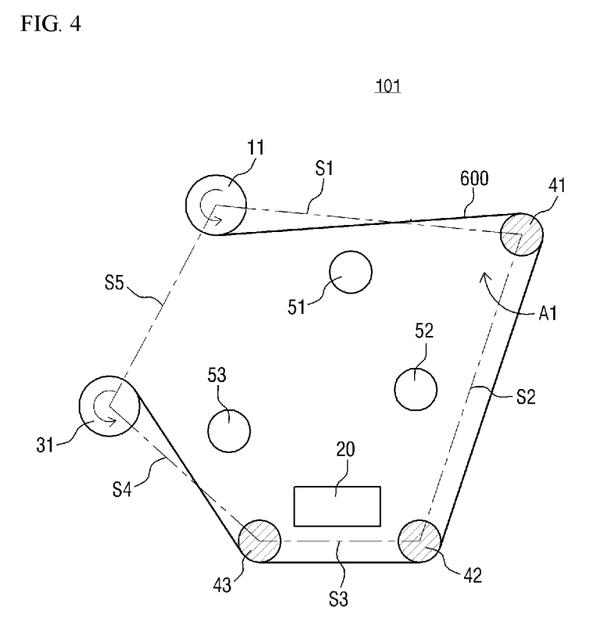
FIG. 4 is a cross-sectional view of the film treating apparatus according to the embodiment of FIG. 2.
Figure 5:
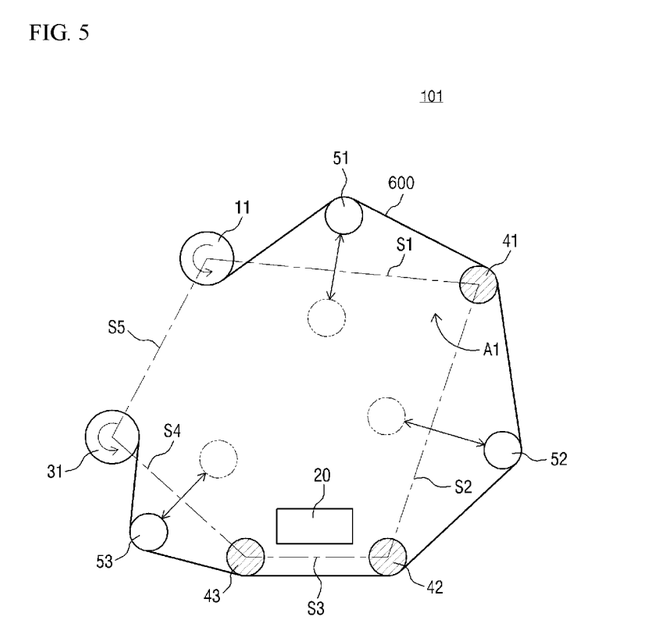
FIG. 5 is a cross-sectional view illustrating the operation of the film treating apparatus according to the embodiment of FIG. 2.

FIG. 4 is a cross-sectional view of the film treating apparatus 101 according to the embodiment of FIG. 2. FIG. 5 is a cross-sectional view illustrating the operation of the film treating apparatus 101 according to the embodiment of FIG. 2.

In FIG. 4, the initial state of the film treating apparatus 101 according to the embodiment of FIG. 2 is illustrated. In the initial state, a film 600 fed from the unwinding roll 11 may move along the first fixed roller 41 while at least partially contacting the first fixed roller 41. That is, the film 600 may move while at least partially contacting an outer circumference of the first fixed roller 41. If the film 600 moves while at least partially contacting the outer circumference of the first fixed roller 41, its travelling direction may be changed. In other words, the first fixed roller 41 may support a first surface of the film 600 and guide the movement of the film 600 such that the film 600 can move along the first fixed roller 41.

The film 600 passing through the first fixed roller 41 may move along the second fixed roller 42 while partially contacting the second fixed roller 42. That is, the film 600 may move while at least partially contacting an outer circumference of the second fixed roller 42. If the film 600 moves while at least partially contacting the outer circumference of the second fixed roller 42, its travelling direction may be changed. In other words, the second fixed roller 42 may support the first surface of the film 600 and guide the movement of the film 600 such that the film 600 can move along the second fixed roller 42.

The film 600 passing through the second fixed roller 42 may move along the third fixed roller 43 while partially contacting the third fixed roller 43. That is, the film 600 may move while at least partially contacting an outer circumference of the third fixed roller 43. If the film 600 moves while at least partially contacting the outer circumference of the third fixed roller 43, its travelling direction may be changed. In other words, the third fixed roller 43 may support the first surface of the film 600 and guide the movement of the film such that the film 600 can move along the third fixed roller 43.

The film 600 passing through the third fixed roller 43 may be wound around and thus collected by the winding roll 31.

In the initial state, a plurality of moving rollers may be located inside the first through fifth line segments S1 through S5. In other words, the moving rollers may be located within the first area A1. The movement of the moving rollers will now be described in more detail with reference to FIG. 5.

Referring to FIG. 5, the moving rollers may move from inside the first through fifth line segments S1 through S5 toward outside the first through fifth line segments S1 through S5. In other words, the moving rollers may move from inside the first area A1 toward outside the first area A1.

The first moving roller 51 may move from inside the first line segment S1 toward outside the first line segment S1. If the first moving roller 51 moves from inside the first line segment S1 toward outside the first line segment S1, it may contact the first surface of the film 600 which is adjacent to the first line segment S1. If the first moving roller 51 continuously moves while remaining in contact with the first surface of the film 600 which is adjacent to the first line segment S1, the film 600 may protrude a certain distance toward a second surface thereof. In other words, the film 600 may protrude a certain distance toward the outside of the first line segment S1, and accordingly, tension may be applied to the film 600. That is, the whole of the film 600 having a first end connected to the unwinding roll 11 and a second end connected to the winding roll 31 may be stretched tight.

The second moving roller 52 may move from inside the second line segment S2 toward outside the second line segment S2. If the second moving roller 52 moves from inside the second line segment S2 toward outside the second line segment S2, it may contact the first surface of the film 600 which is adjacent to the second line segment S2. If the second moving roller 52 continuously moves while remaining in contact with the first surface of the film 600 which is adjacent to the second line segment S2, the film 600 may protrude a certain distance toward the second surface thereof. In other words, the film 600 may protrude a certain distance toward the outside of the second line segment S2, and accordingly, tension may be applied to the film 600. That is, the whole of the film 600 having the first end connected to the unwinding roll 11 and the second end connected to the winding roll 31 may be stretched tight.

The third moving roller 53 may move from inside the fourth line segment S4 toward outside the fourth line segment S4. If the third moving roller 53 moves from inside the fourth line segment S4 toward outside the fourth line segment S4, it may contact the first surface of the film 600 which is adjacent to the fourth line segment S4. If the third moving roller 53 continuously moves while remaining in contact with the first surface of the film 600 which is adjacent to the fourth line segment S4, the film 600 may protrude a certain distance toward the second surface thereof. In other words, the film 600 may protrude a certain distance toward the outside of the fourth line segment S4, and accordingly, tension may be applied to the film 600. That is, the whole of the film 600 having the first end connected to the unwinding roll 11 and the second end connected to the winding roll 31 may be stretched tight.

If a plurality of moving rollers move as described above, tension may be applied to the film 600. That is, since the film 600 is supported by a plurality of fixed rollers and a plurality of moving rollers, greater tension may be applied to the film 600 as compared with the initial state where the film 600 is supported only by a plurality of fixed rollers. Accordingly, the film 600 stretched more tightly can travel along the moving rollers and the fixed rollers.

In FIG. 5, the first moving roller 51, the second moving roller 52, and the third moving roller 53 move simultaneously. However, the movement of the first moving roller 51, the second moving roller 52, and the third moving roller 53 is not limited thereto. That is, the first moving roller 51, the second moving roller 52, and the third moving roller 53 may move simultaneously, or any one or more of the first moving roller 51, the second moving roller 52, and the third moving roller 53 may move.

As described above, the film processor 20 may process the film 600. In one embodiment, the film 600 may be an ACF having a support layer and a film layer attached onto the support layer. If the film 600 is an ACF, the film processor 20 may include a bonding unit which attaches the film layer of the ACF to a liquid crystal display panel. This is described in more detail with reference to FIG. 6.

Figure 6:
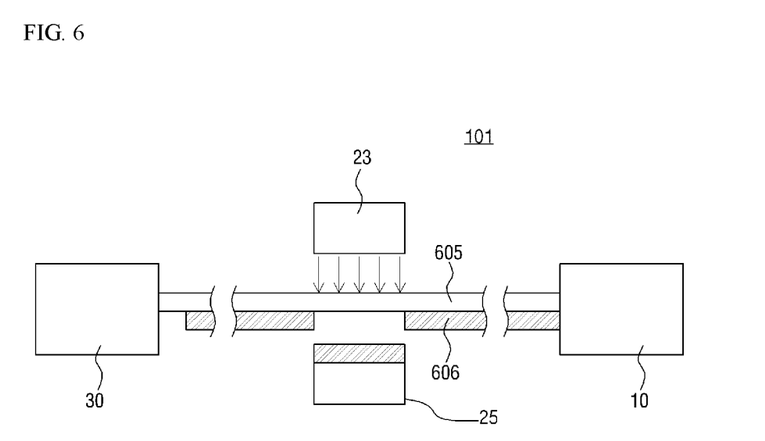
FIG. 6 is a schematic cross-sectional view illustrating a process of processing a film using a film processor of the film treating apparatus according to the embodiment of FIG. 2.

FIG. 6 is a schematic cross-sectional view illustrating a process of processing a film using the film processor 20 of the film treating apparatus 101 according to the embodiment of FIG. 2.

Referring to FIG. 6, the film processor 23 of the film treating apparatus 101 according to the embodiment of FIG. 2 may attach a film layer 606 of an ACF to a target object 25. The target object 25 may be, for example, a liquid crystal display panel. For ease of description, a case where the target object 25 is a liquid crystal display panel will be used as an example. However, the type of the target object 25 is not limited thereto.

As described above, a film fed from the unwinding roll 11 is processed by the film processor 23, and the processed film is collected by the winding roll 31.

In the film treating apparatus 101, the film processor 23 may attach the film layer 606 of the ACF to the liquid crystal display panel. To this end, the film processor 23 may include a bonding unit (not shown) which attaches the film layer 606 to the liquid crystal display panel. In one embodiment, the bonding unit may be placed adjacent to a first surface of the ACF, and the target object 25 (e.g., the liquid crystal display panel) may be placed adjacent to a second surface of the ACF.

The bonding unit may attach the film layer 606 of the ACF to the liquid crystal display panel. There is no restriction on the way the bonding unit attaches the film layer 606 of the ACF to the liquid crystal display panel. The bonding unit can attach the film layer 606 of the ACF to the liquid crystal display panel using various methods that have been developed and commercialized or are realizable depending on future technological developments.

When the bonding unit attaches the film layer 606 to the liquid crystal display panel, the winding roll 31 may collect the processed film. That is, if the bonding unit attaches the film layer 606 to the liquid crystal display panel, the ACF may have a support layer 605 only or a portion of the film layer 606 which remains attached onto the support layer 605. Accordingly, the winding roll 31 may collect the ACF having the support layer 605 only or a portion of the film layer 606 which remains attached onto the support layer 605.

Hereinafter, other embodiments of the present invention will be described. In the following embodiments, elements identical to those described above are indicated by like reference numerals, and thus a redundant description thereof will be omitted or given briefly.

Figure 7:
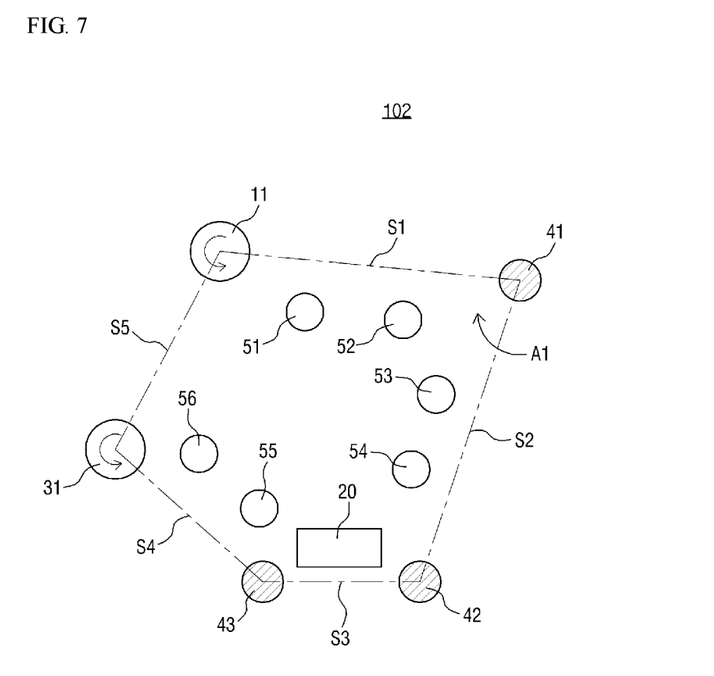
FIGS. 7 and 8 are cross-sectional views of a film treating apparatus according to another embodiment of the present invention.
Figure 8:
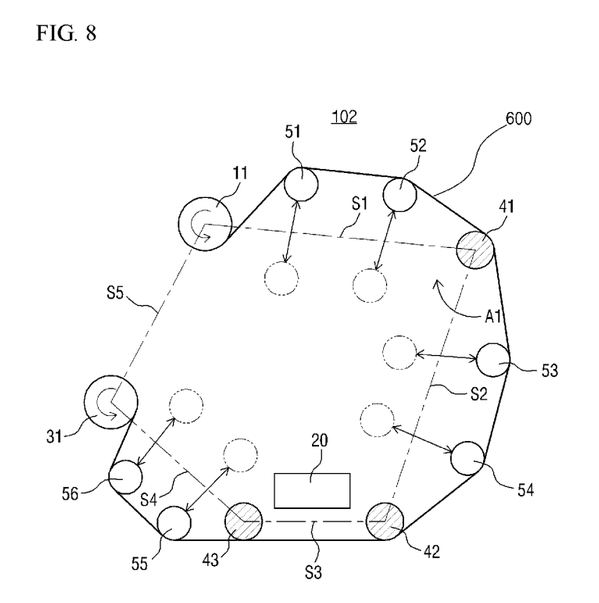

FIGS. 7 and 8 are cross-sectional views of a film treating apparatus 102 according to another embodiment of the present invention.

Referring to FIGS. 7 and 8, the film treating apparatus 102 is different from the film treating apparatus 101 of FIG. 2 in that it includes six moving rollers. As described above, the film treating apparatus 101 may include a plurality of moving rollers.

For ease of description, moving rollers disposed between an unwinding roll 11 and a first fixed roller 41 will be referred to as a first moving roller 51 and a second moving roller 52, moving rollers disposed between the first fixed roller 41 and a second fixed roller 42 will be referred to as a third moving roller 53 and a fourth moving roller 54, and moving rollers disposed between the third moving roller 53 and a winding roll 31 will be referred to as a fifth moving roller 55 and a sixth moving roller 56.

In an initial state, the first through sixth moving rollers 51 through 56 may be located inside first through fifth line segments S1 through S5, in the other words, within a first area A1. In addition, the first moving roller 51 and the second moving roller 52 may be placed adjacent to the first line segment 51, the third moving roller 53 and the fourth moving roller 54 may be placed adjacent to the second line segment S2, and the fifth moving roller 55 and the sixth moving roller 56 may be placed adjacent to the fourth line segment S4.

The first moving roller 51 and the second moving roller 52 may move across the first line segment 51. That is, the first moving roller 51 and the second moving roller 52 may move from inside the first line segment 51 to outside the first line segment 51 or from outside the first line segment 51 to inside the first line segment 51. In other words, the first moving roller 51 and the second moving roller 52 may move from inside the first area A1 to outside the first area A1 or from outside the first area A1 to inside the first area A1.

If the first moving roller 51 and the second moving roller 52 move from inside the first line segment 51 toward outside the first line segment 51, they may contact a first surface of a film 600 which is adjacent to the first line segment 51. Here, the first moving roller 51 and the second moving roller 52 may contact different points on the first surface of the film 600. If the first moving roller 51 and the second moving roller 52 continuously move while remaining in contact with the first surface of the film 600, the film 600 may protrude a certain distance toward a second surface thereof. In other words, the film 600 may protrude a certain distance toward the outside of the first line segment 51. Accordingly, tension may be applied to the film 600. That is, the whole of the film 600 having an end connected to the unwinding roll 11 and the other end connected to the winding roll 31 may be stretched tight.

The third moving roller 53 and the fourth moving roller 54 may move from inside the second line segment S2 toward outside the second line segment S2, and the fifth moving roller 55 and the sixth moving roller 56 may move from inside the fourth line segment S4 toward outside the fourth line segment S4. The way the third and fourth moving rollers 53 and 54 and the fifth and sixth moving rollers 55 and 56 move may be substantially the same as the way the first and second moving rollers 51 and 52 move, and thus a redundant description thereof will be omitted.

Figure 9:
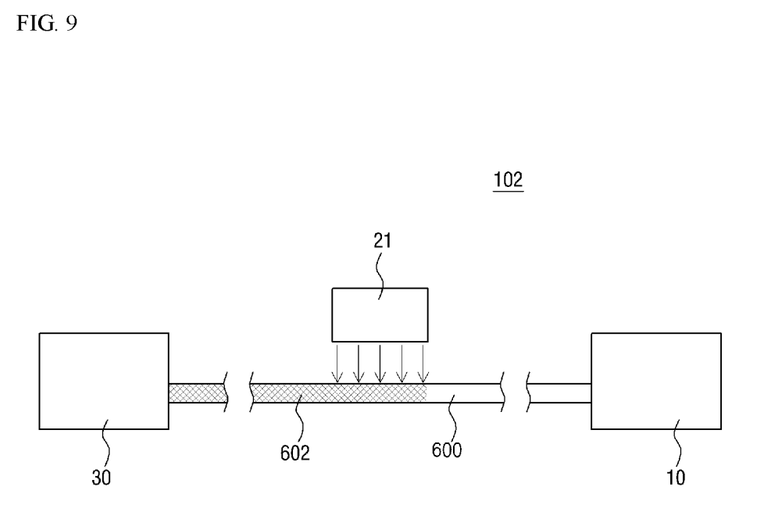
FIG. 9 is a cross-sectional view of a film processor of the film treating apparatus according to another embodiment.

FIG. 9 is a cross-sectional view of a film processor 21 of the film treating apparatus 102 according to another embodiment.

Referring to FIG. 9, the film processor 21 may change physical and chemical properties of a film by performing particular treatment on the film.

As described above, a film 600 fed from a film feeder 10 may be processed by the film processor 21. In an example, the film processor 21 may perform particular treatment on the film 600. There is no restriction on the type of processing performed on the film 600. For example, the film 600 may be irradiated with ultraviolet light or infrared light, or may be heated. To irradiate the film 600 with ultraviolet light or infrared light, the film processor 21 may include a light irradiating unit which irradiates ultraviolet light or infrared light. To heat the film 600, the film processor 21 may include a heater for heating the film 600. When the film 600 is irradiated with ultraviolet light or infrared light, or is heated, physical and chemical properties of the film 600 may change. The film 600 processed by the film processor 21 (the processed film 600 is indicated by reference numeral 602) may be collected by a film collector 30.

Figure 10:
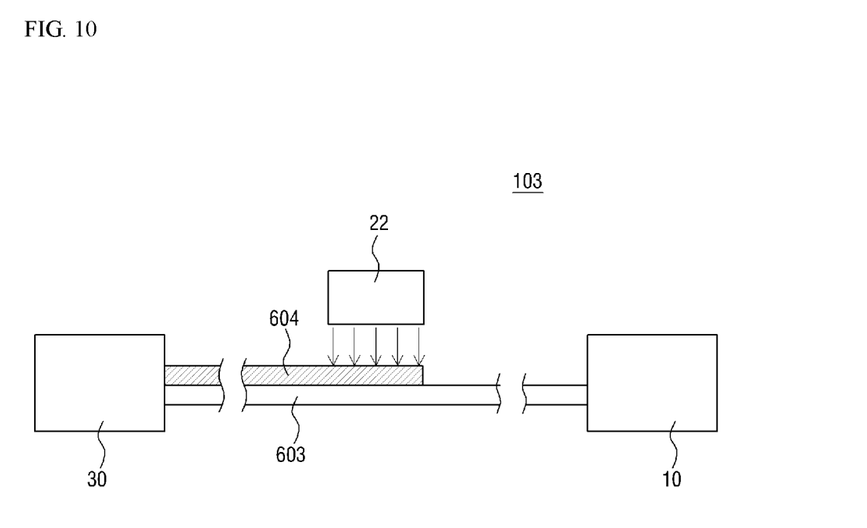
FIG. 10 is a cross-sectional view of a film processor of a film treating apparatus according to another embodiment of the present invention.

FIG. 10 is a cross-sectional view of a film processor 22 of a film treating apparatus 103 according to another embodiment of the present invention.

Referring to FIG. 10, the film processor 22 may coat a film 603 with a particular material or may form a film stacked structure by attaching another film onto the film 603.

The film processor 22 may coat the film 603 with a particular material. There is no restriction on the coating method. For example, an inkjet printing method or a nozzle printing method may be used. To coat the film 603 with a particular material, the film processor 22 may include a nozzle unit which ejects the material.

The film processor 22 may form a film stacked structure by attaching another film 604 onto the film 603. There is no restriction on the method of attaching the film 604 onto the film 603. For example, pressure and/or heat may be applied to the film 603. To apply pressure and/or heat to the film 603, the film processor 22 may include a laminating device.

A film treating method according to an embodiment of the present invention will now be described. For simplicity, elements substantially identical or similar to those of FIGS. 2 through 4 are identified by like reference numerals, and thus a redundant description thereof will be omitted. The film treating method may be performed by the film treating apparatuses according to the embodiments of the present invention.

The film treating method includes feeding a film 600 from a film feeder 10, moving the film 600 along an outer circumference of a fixed support unit 40 which supports the film 600 and guides the movement of the film 600, applying tension to the film 600 by moving a variable support unit 50 from a first surface of the film 600 toward a second surface of the film 600, processing the film 600, and collecting the processed film 600.

The film 600 is fed from the film feeder 10. The way the film 600 is fed from the film feeder 10 may be substantially the same as the way described above in the film treating apparatuses according to the embodiments of the present invention, and thus a detailed description thereof will be omitted.

The moving of the film 600 along the outer circumference of the fixed support unit 40 which supports the film 600 and guides the movement of the film 600 is performed. As described above, the fixed support unit 40 may include a first fixed roller 41 which is separated from the film feeder 10 in a first direction, a second fixed roller 42 which is separated from the first fixed roller 41 in a second direction different from the first direction, and a third fixed roller 43 which is separated from the second fixed roller 42 in a third direction different from the second direction. That is, a plurality of fixed rollers support the film 600 and guide the movement of the film 600 in substantially the same way as described above in the film treating apparatuses according to the embodiments of the present invention.

Next, tension to the film 600 may be applied by moving the variable support unit 50 from the first surface of the film 600 toward the second surface of the film 600. In one embodiment, the variable support unit 50 may include a plurality of moving rollers. The variable support unit 50 may move from the first surface of the film 600 toward the second surface of the film 600 in substantially the same way as the film treating apparatuses according to the embodiments operates.

The processing of the film 600 may be performed.

The processing of the film 600 may include changing physical and chemical properties of the film 600 by irradiating the film 600 with ultraviolet light or infrared light, or by heating the film 600.

In the film treating method, the film 600 may be an ACF having a support layer 605 and a film layer 606. The processing of the film 600 may include attaching the film layer 606 to a liquid crystal display panel by using a film processor 23. The film processor 23 may include a bonding unit. The film processor 23 may attach the film layer 606 to the liquid crystal display panel in substantially the same way as described above in the film treating apparatus according to the embodiment of FIG. 6.

Finally, the collecting of the processed film 600 may be performed. The processed film 600 may collect the processed film 600 in substantially the same way as described above in the film treating apparatuses according to the embodiments of the present invention.

A film treating method according to another embodiment of the present invention will now be described.

In one embodiment of the film treating method, processing a film may include changing physical and chemical properties of a film 600 by performing particular treatment on the film 600.

In addition, the changing of the physical and chemical properties of the film 600 may include irradiating the film 600 with ultraviolet light or infrared light, or heating the film 600. The film 600 may be irradiated with ultraviolet light or infrared light or may be heated in substantially the same way as described above in the film treating apparatuses according to the embodiments of the present invention (see for example FIG. 9).

In the film treating method, the processing of the film may include coating a film 603 with a particular material or forming a film stacked structure by attaching another film 604 onto the film 603.

A film processor 22 may coat the film 603 with a particular material or may form a film stacked structure by attaching another film 604 onto the film 603. Here, the film processor 22 may coat the film 603 with a particular material or form a film stacked structure by attaching another film 604 onto the film 603 in substantially the same way as described above in the film treating apparatuses according to the embodiments of the present invention (see for example FIG. 10).

Embodiments of the present invention provide at least one of the following advantages. A film can be replaced easily. In addition, the time required to replace the film can be reduced, thereby improving the overall process efficiency.

However, the effects of the present invention are not restricted to the ones set forth herein. The above and other effects of the present invention will become more apparent to one of daily skill in the art to which the present invention pertains by referencing the claims.

While the present invention has been particularly shown and described with reference to certain embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A film treating apparatus comprising:
    a film feeder configured to feed a film having a first surface and a second surface;
    a film processor configured to process the film fed from the film feeder;
    a film collector configured to collect the film from the film processor;
    a fixed support unit configured to support at least one of the first surface or the second surface of the film and to guide the movement of the film, wherein the fixed support unit comprises:
        a first fixed roller separated from the film feeder in a first direction,
        a second fixed roller separated from the first fixed roller in a second direction different from the first direction, and
        a third fixed roller in a third direction different from the second direction; and
    a variable support unit configured to apply tension to the film by moving from the first surface of the film toward the second surface of the film or from the second surface of the film toward the first surface of the film, wherein the variable support unit comprises a first moving roller disposed between the film feeder and the first fixed roller,
    wherein a first line segment connecting the film feeder and the first fixed roller is defined, and
    wherein the first moving roller moves across the first line segment.

2. The apparatus of claim 1, wherein the variable support unit further comprises a plurality of moving rollers.

3. The apparatus of claim 2, wherein the film processor is disposed between the second fixed roller and the third fixed roller.

4. The apparatus of claim 3, wherein the variable support unit further comprises a second moving roller disposed between the first fixed roller and the second fixed roller, and a third moving roller disposed between the third fixed roller and the film collector.

5. The apparatus of claim 4, wherein a second line segment connecting the first fixed roller and the second fixed roller, and a third line segment connecting the third fixed roller and the film collector are defined, wherein the second moving roller moves across the second line segment, and the third moving roller moves across the third line segment.

6. A film treating apparatus comprising:
    a film feeder configured to feed a film having a first surface and a second surface;
    a film processor configured to process the film fed from the film feeder;
    a film collector configured to collect the film from the film processor;
    a fixed support unit configured to support at least one of the first surface or the second surface of the film and to guide the movement of the film; and
    a variable support unit configured to apply tension to the film by moving from the first surface of the film toward the second surface of the film or from the second surface of the film toward the first surface of the film,
    wherein the fixed support unit comprises a plurality of fixed rollers,
    wherein a polygonal first area having the film feeder, the fixed rollers and the film collector as vertices thereof is defined, and the variable support unit comprises a plurality of moving rollers, wherein the moving rollers move from inside the first area toward outside the first area or from outside the first area toward inside the first area.

7. The apparatus of claim 1, wherein the film feeder is configured to feed an anisotropic conductive film (ACF) which comprises a film layer and a support layer, and the film processor comprises a bonding unit configured to attach the film layer of the ACF to a target object.

8. The apparatus of claim 1, wherein the film processor is configured to change at least one of physical or chemical properties of the film by performing a treatment on the film.

9. The apparatus of claim 1, wherein the film processor is configured to coat the film with a particular material or to form a film stacked structure by attaching another film onto the film.

10. A film treating apparatus comprising:
an unwinding roll;
a first fixed roller separated from the unwinding roll in a first direction;
a second fixed roller separated from the first fixed roller in a second direction different from the first direction;
a film processor separated from the second fixed roller in a third direction different from the second direction;
a third fixed roller separated from the second fixed roller with the film processor interposed therebetween;
a winding roll separated from the third fixed roller;
a first moving roller disposed between the unwinding roll and the first fixed roller;
a second moving roller disposed between the first fixed roller and the second fixed roller; and
a third moving roller disposed between the third fixed roller and the winding roll.

11. The apparatus of claim 10, wherein a first line segment connecting the unwinding roll and the first fixed roller, a second line segment connecting the first fixed roller and the second fixed roller, and a third line segment connecting the third fixed roller and the winding roll are defined, wherein the first moving roller moves across the first line segment, the second moving roller moves across the second line segment, and the third moving roller moves across the third line segment.

12. The apparatus of claim 10, wherein an area having the unwinding roll, the first fixed roller, the second fixed roller, the third fixed roller and the winding roll as vertices thereof is defined, wherein the first moving roller, the second moving roller and the third moving roller move from inside the first area toward outside the area.

13. The apparatus of claim 10, wherein the unwinding roll feeds an ACF which comprises a film layer and a support layer, and the film processor comprises a bonding unit configured to attach the film layer of the ACF to a target object.

* * * * *